United States Patent [19]

Byrne

[11] Patent Number: 5,379,240
[45] Date of Patent: Jan. 3, 1995

[54] SHIFTER/ROTATOR WITH PRECONDITIONED DATA

[75] Inventor: Jeffrey S. Byrne, Plano, Tex.

[73] Assignee: Cyrix Corporation, Richardson, Tex.

[21] Appl. No.: 27,342

[22] Filed: Mar. 8, 1993

[51] Int. Cl.6 .............................................. G06F 7/38
[52] U.S. Cl. ............................................. 364/715.08
[58] Field of Search ................... 364/715.08, 715.11, 364/900, 748; 395/375, 425, 725

[56] References Cited

U.S. PATENT DOCUMENTS

Re. 33,664  8/1991  Kang et al. ........................ 364/900
4,472,788   9/1984  Yamazaki ........................... 364/900
4,839,839   6/1989  Tokumaru et al. ............... 364/715.08
5,113,516   5/1992  Johnson ............................. 395/500

Primary Examiner—Roy N. Envall, Jr.
Assistant Examiner—Emmanuel Moise
Attorney, Agent, or Firm—Andrew S. Viger; John L. Maxin

[57] ABSTRACT

Rotate circuitry operable to perform rotate operations on various size operands including preconditioning circuitry (10) for duplicating an operand a predetermined number of times to form a preconditioned word. The rotate operation is performed by shifter (22) which shifts the preconditioned word by a specified number of bits. For rotate through carry operations, Cy bit of the carry flag is inserted in the preconditioned word prior to shifting.

17 Claims, 14 Drawing Sheets

FIG. 4a

8 BIT OPERAND

| B0 | B0 | B0 | B0 | B0 | B0 | B0 | B0 |
|---|---|---|---|---|---|---|---|
| 7 ... 0 | 7 ... 0 | 7 ... 0 | 7 ... 0 | 7 ... 0 | 7 ... 0 | 7 ... 0 | 7 ... 0 |

FIG. 4b

16 BIT OPERAND

| B1 | B0 | B1 | B0 | B1 | B0 | B1 | B0 |
|---|---|---|---|---|---|---|---|
| 15 ... 8 | 7 ... 0 | 15 ... 8 | 7 ... 0 | 15 ... 8 | 7 ... 0 | 15 ... 8 | 7 ... 0 |

FIG. 4c

32 BIT OPERAND

| B3 | B2 | B1 | B0 | B3 | B2 | B1 | B0 |
|---|---|---|---|---|---|---|---|
| 31 ... 24 | 23 ... 16 | 15 ... 8 | 7 ... 0 | 31 ... 24 | 23 ... 16 | 15 ... 8 | 7 ... 0 |

BEFORE ROTATING: | 15 | ... | 8 | 7 | ... | 0 | 15 | ... | 8 | 7 | ... | 0 | 15 | ... | 8 | 7 | ... | 0 |
B1 ... B0 ... B1 ... B0 ... B1 ... B0

FIG. 6b

ROTATE RIGHT 5: | XXXXX | 15 | ... | 13 | 12 | ... | 5 | 4 | ... | 13 | 12 | ... | 5 | 4 | ... | 13 | 12 | ... | 5 |

SELECTED WORD / DATA STORED IN GENERAL PURPOSE REGISTER

FIG. 6c

ROTATE LEFT 12: | 3 | ... | 12 | 11 | ... | 4 | 3 | ... | 12 | 11 | ... | 4 | 3 | ... | 0XXXX | XXXXXXXX |

SELECTED WORD / DATA STORED IN GENERAL PURPOSE REGISTER

FIG. 7a

BEFORE ROTATING: | B3 | | B2 | | B1 | | B0 | |
| 31 ... 24 | 23 ... 16 | 15 ... 8 | 7 ... 0 |

FIG. 7b

ROTATE RIGHT 13: | XXXXXXX | XXXXX 31...29 | 28 ... 21 | 20 ... 13 | 12 ... 5 | 4 ... 29 | 28 ... 21 | 20 ... 13 |

DATA STORED IN GENERAL PURPOSE REGISTER

FIG. 7c

ROTATE LEFT 9: | 22 ... 15 | 14 ... 7 | 6 ... 31 | 30 ... 23 | 22 ... 15 | 14 ... 7 | 6 ... 0X | XXXXXXX |

DATA STORED IN GENERAL PURPOSE REGISTER

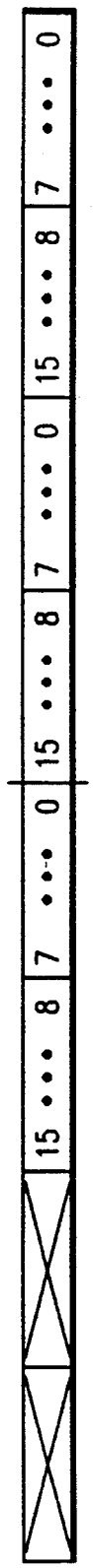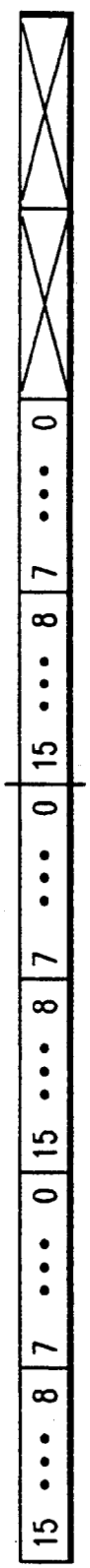
FIG. 8a  8-BIT OPERAND -- ROTATE RIGHT
FIG. 8b  16-BIT OPERAND -- ROTATE RIGHT
FIG. 8c  8-BIT OPERAND -- ROTATE LEFT
FIG. 8d  16-BIT OPERAND -- ROTATE LEFT

SHIFTER/ROTATOR WITH PRECONDITIONED DATA

TECHNICAL FIELD OF THE INVENTION

The invention relates generally to digital circuits, and more particularly to a rotator design and method that performs rotates using an initial preconditioning stage to duplicate data input to the shifter based on operand size, thereby reducing the complexity of the multiplexing logic in the shift matrix. In an exemplary embodiment, the shifter preconditioning technique is used in the execution unit of a 486 type microprocessor to implement rotates on 8, 16, and 32 bit operands.

BACKGROUND OF THE INVENTION

Rotate operations are common functions performed in the execution unit of a microprocessor and other circuits. Each of the rotate instructions shifts the bits of the specified register or memory operand ("source operand"). In the case of a microprocessor that executes the 486 instruction set, shift logic is used in implementing rotate operations such as rotate left/right (ROL/ROR) and rotate through carry left/right (RCL/RCR).

The ROL (rotate left) instruction shifts all of the bits of the source operand left by one or more positions, with the most significant bits shifting around and becoming the least significant bits. The ROR (rotate right) instruction performs the rotate operation in the opposite direction. It shifts all bits to the right by one or more positions, with the least significant bits shifting around and becoming the most significant bits.

The RCL and RCR (rotate carry left and right) instructions use a carry flag as part of the rotation process for rotating the source operand. The RCL instruction shifts the carry flag into the least significant bit and shifts the most significant bit into the carry flag. Similarly, the RCR instruction shifts the carry flag into the most significant bit and shifts the least significant bit into the carry flag.

The rotate instruction includes a second operand, which may be either the contents of a register or an immediate number, specifying the number of positions to shift the source operand. This rotation count can be anywhere between zero and thirty-one. Only the five least significant bits of the rotation count are used.

Without limiting the scope of the invention, this background information is provided in the context of a specific problem to which the invention has application: in an ×86 type microprocessor, an improved shifter design capable of performing left/right rotate operations based on operand size (i.e., 8, 16, and 32 bit) while reducing the complexity of the shift matrix logic.

For a conventional 32 bit ×86 type microprocessor architecture, a conventional rotate matrix design would have to include multiplexing logic capable of performing rotates based on operand size. Specifically, for rotate operations, the shift matrix would receive a 32 bit input with 1-4 bytes of valid data. The specified rotate operation would then be performed by appropriately shifting and multiplexing the data byte in response to a five bit shift count, an operand size indication and associated control information. There is considerable complexity to this multiplexing logic and associated control to implement all of the various rotate operations.

Accordingly, a specific object of the invention is to provide an improved shifter design in which multiplexing logic is less complex.

SUMMARY OF THE INVENTION

The rotation circuitry of the present invention comprises preconditioning circuitry for duplicating an operand a predetermined number of times thus creating a preconditioned word. Shifting circuitry is provided to shift the preconditioned word by a selected number of bits to affect the rotate operation without complex circuitry.

The technical advantages of the invention include the following. The rotator design is particularly useful in performing rotates on various operand sizes for a specified number of bits. The use of a front-end preconditioning stage significantly reduces the complexity of the rotating logic by reducing the rotate operation to a shift operation. The preconditioning can be easily implemented by selectively storing all or part of an input word into various portions of a register.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

BRIEF DESCRIPTION OF THE DRAWINGS

For a more complete understanding of the present invention and the advantages thereof, reference is now made to the following descriptions taken in conjunction with the accompanying drawings, in which:

FIGS. 4a-4c illustrate preconditioned words formed by the preconditioning circuitry for an 8 bit, a 16 bit and a 32 bit operand respectively.

Figures 5A, 5B, 5C, 5D, 5E:
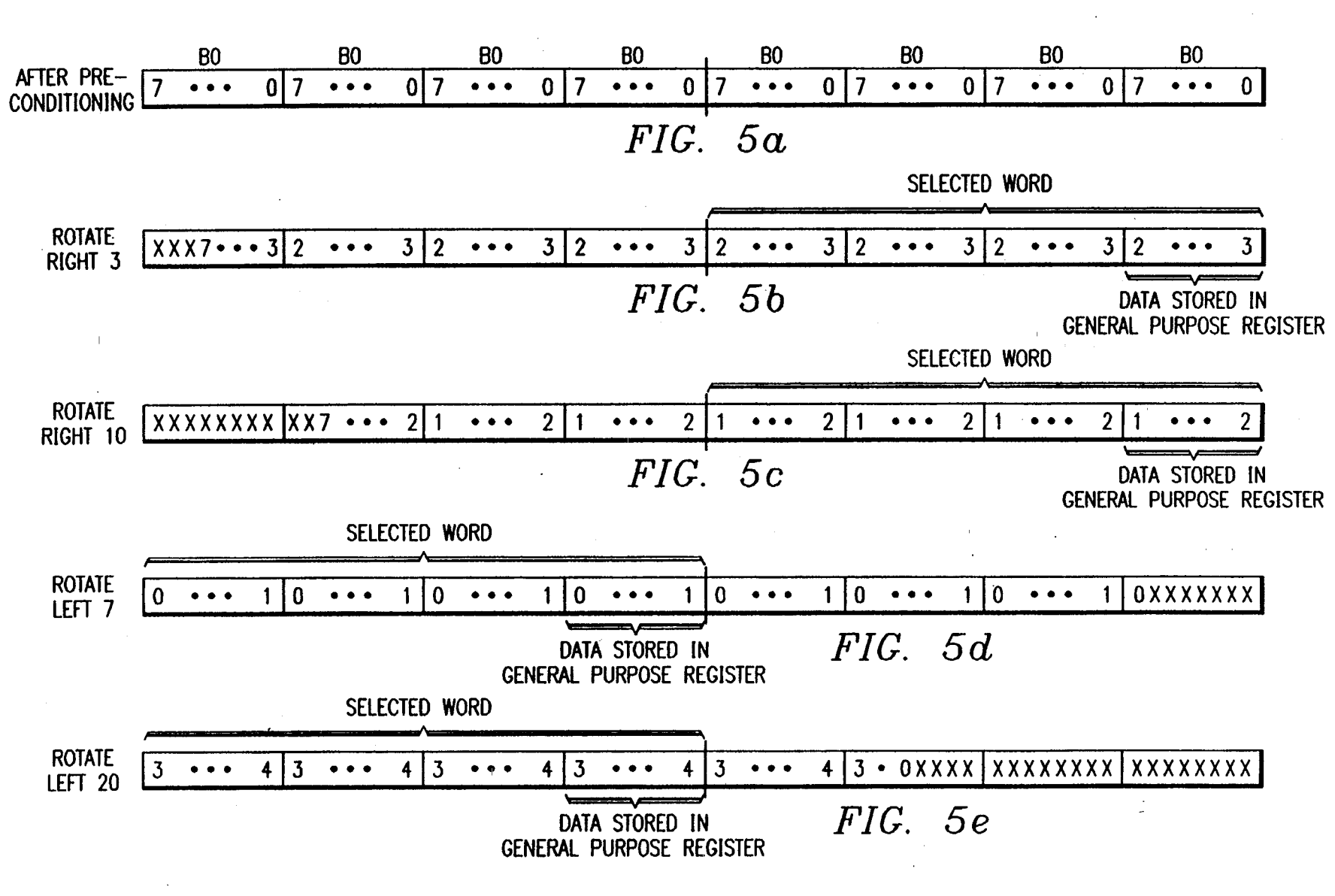

FIGS. 5a-5e illustrate examples of preconditioned words formed from 8 bit operands being rotated in different directions and by different rotation counts.

FIGS. 6a-6c illustrate examples of preconditioned words formed from 16 bit operands being rotated in different directions and by different rotation counts.

FIGS. 7a-7c illustrate examples of preconditioned words formed from 32 bit operands being rotated in different directions and by different rotation counts.

FIGS. 8a-8d illustrate alternative preconditioned words formed for 8 bit and 16 bit operands for a specific direction of rotation.

DETAILED DESCRIPTION OF THE INVENTION

The preferred embodiment of the present invention is best understood by referring to FIGS. 1-10f of the drawings, like numerals being used for like and corresponding parts of the various drawings.

Figure 1:
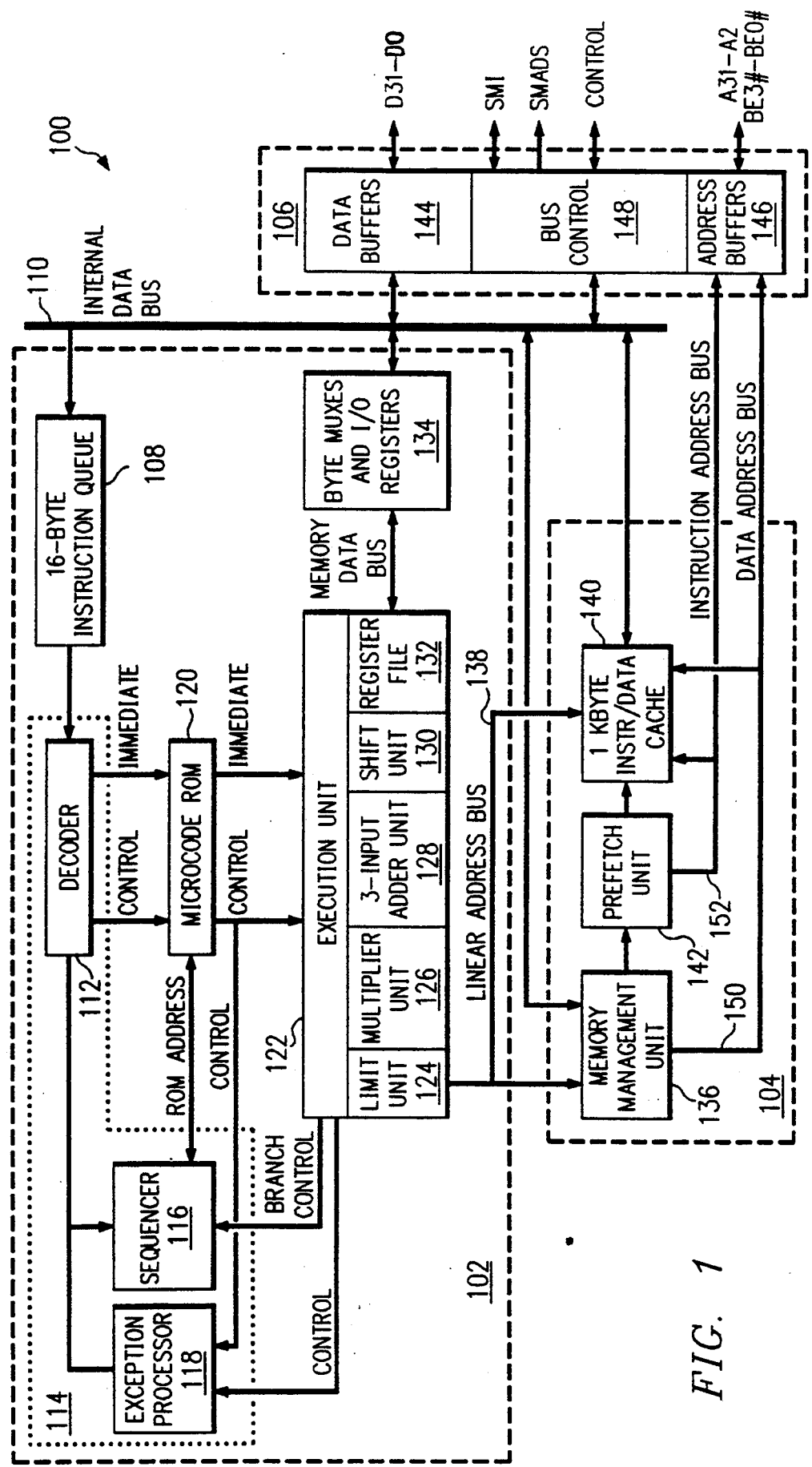
FIG. 1 illustrates a block diagram of an exemplary microprocessor circuit which may incorporate the present invention.

FIG. 1 illustrates a block diagram of the various subcircuits of a preferred embodiment of a microprocessor 100 which includes the rotating circuitry (shown in FIG. 2 at 10) of the present invention. For purposes of illustration, the microprocessor 100 will be described in connection with a microprocessor which is pin-compatible and instruction-compatible with the 80×86 family of processors by Intel Corporation, specifically the 8086/486 microprocessors. The microprocessor 100 comprises three main functional groups: the core circuit 102, the memory circuit 104, and the bus controller 106. The core circuitry 102 includes an instruction queue 108 coupled to an internal data bus 110. The output of the instruction queue 108 is coupled to a decoder 112 of the decode/sequence circuitry 114. The decode/sequence circuitry 114 also includes a sequencer 116 and an exception processor 118. The decoder 112 is coupled to a microcode ROM 120, exception processor 118 and sequencer 116. The sequencer 116 is also coupled to the microcode ROM 120 and to an execution unit 122. The execution unit includes a limit unit 124, a multiplier unit 126, adder units 128, a shift unit 130, and a register file 132. The execution unit 122 is coupled to the microcode ROM 120 and to multiplexer and I/O register circuitry 134. The memory circuitry 104 comprises a memory management unit 136 coupled to a linear address bus 138 which is also connected to the execution unit 122 and an instruction/data cache memory 140. Memory management unit 136 is further coupled to the internal data bus 110. A prefetch unit 142 is coupled between the memory management unit 136 and the cache 140. Bus controller 106 includes data buffers 144, address buffers 146 and control circuitry 148. The data buffers 144 are coupled to the data I/O pins D31–D0, the address buffers 146 are coupled to the address pins A31–A2 and BE3#–BE0#. A data address bus 150 couples the memory management unit 136, the cache 140 and the address buffer 146. An instruction address bus 152 couples the prefetch unit 142, cache 140 and address buffer 146. The data buffers 144 are coupled to the internal data bus 110.

Figure 2:
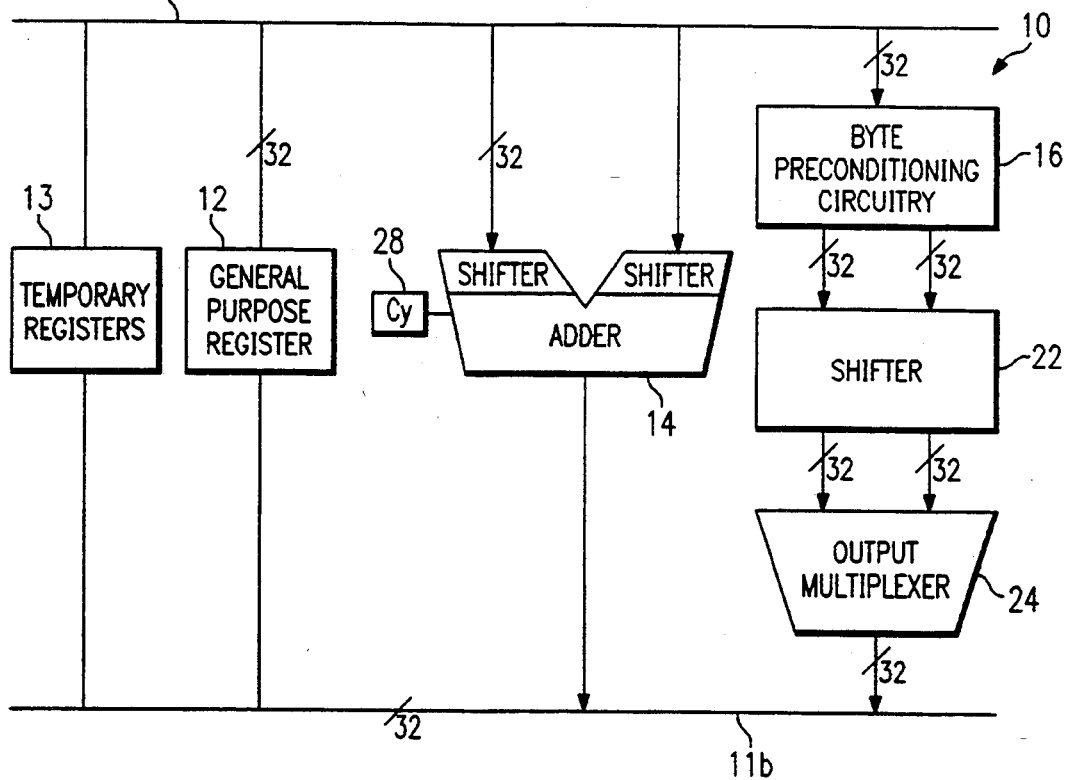
FIG. 2 illustrates a block diagram of a rotate circuit which incorporates the present invention.

FIG. 2 illustrates a circuit diagram of a portion of the execution unit (see FIG. 1) used in connection with a rotate operation. The rotate/shift circuitry 10 is coupled between 32-bit buses 11a–b along with a general purpose register 12 and adder 14. General purpose register 12 is thirty-two bits in width and thus has the capability of storing operands of eight bits, sixteen bits and thirty-two bits in width. Register 12 stores the operands on which the rotation function will be performed as well as the resulting operand after rotation.

Rotate/shift circuitry 10 includes preconditioning circuitry 16, shifter 22 and output multiplexer 24. Shifter 22 receives an upper thirty-two bit word and a lower thirty-two bit word from the byte preconditioning circuitry 16 and is capable of shifting the sixty-four bits in either direction. Shifter 22 thus can hold eight bytes of data wherein the lower thirty-two bit word is comprised of byte0–byte3 and the upper thirty-two bit word is comprised of byte4–byte7.

Preconditioning circuitry 16 operates to form a sixty-four bit preconditioned word and to load the word into shifter 22. The preconditioned word is formed by duplicating the operand a predetermined number of times depending on the size of the operand as described below.

The functionality of the preconditioning circuitry 16 is illustrated in greater detail in connection with FIG. 3. Bus 11a transmits four eight bit blocks, namely B0–B3, where B0 is the least significant eight bits and B3 is the most significant eight bits. Preconditioning circuitry 16 comprises three multiplexers 20a, 20b and 20c for selecting between B0–B3 to input into the particular bytes of shifter 22 responsive to the size of the operand being rotated. Multiplexer 20a has B0 and B1 as inputs, multiplexer 20b has B0 and B2 as inputs and multiplexer 20c has B0, B1 and B3 as inputs. Two control lines, OP-SIZE, control the selection based on operand size.

Eight bit operands are positioned in the lower 8-bits of a thirty-two bit word of general purpose register 12 (which is transmitted on bus 11a). Likewise, sixteen bit operands are positioned in the lower sixteen bits of a thirty-two bit word of general purpose register 12. However, it is noted that if the ×86 language supported rotates on intermediate bytes of a thirty-two bit word, then aligning circuitry could be used to properly precondition the word.

The contents of B0 are input directly to both byte0 and byte4 of latch 21. The output of multiplexer 20a is input into both byte1 and byte5 of latch 21. Similarly, the output of multiplexer 20b is input into byte2 and byte6 of latch 21. The output of multiplexer 20c is input into byte3 and byte7 of latch 21.

Figure 3:
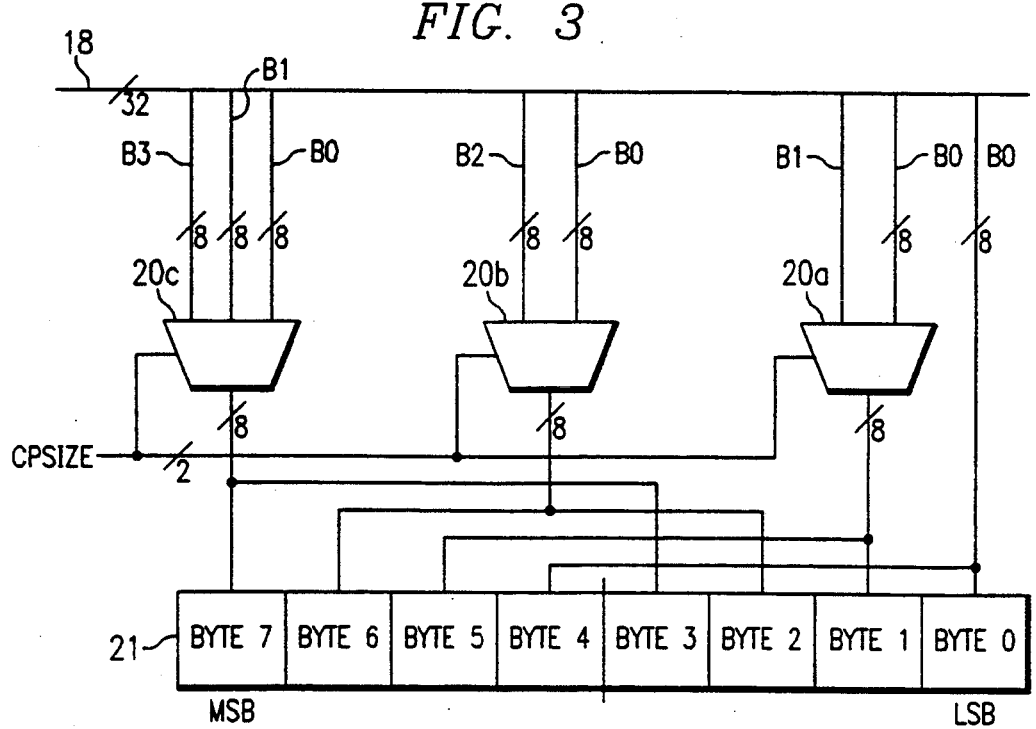
FIG. 3 illustrates a block diagram of the preconditioning circuitry used in forming a preconditioned word in the shifter.

It should be noted that while the diagram of FIG. 3 illustrates the function of the preconditioning circuitry, the implementation of the preconditioning circuitry could take many forms. For example, using a register file with two outputs, duplicated thirty-two bit words could be presented to the preconditioning circuitry, and each half of the 64-bit double word could be separately preconditioned.

The possible preconditioned words that can be formed are illustrated in FIGS. 4a–4c. If the operand size is eight, multiplexers 20a–20c form the preconditioned word shown in FIG. 4a, namely, B0 is repeated for each byte of the 64-bit double-word. For a sixteen bit operand, the multiplexers form the preconditioned word shown in FIG. 4b as four 16-bit words comprising B0 and B1. Likewise if the operand is thirty-two bits, the multiplexer forms the preconditioned word shown in FIG. 4c as two 32-bit words formed from B0–B3.

As shown in FIGS. 4a–c, preconditioning circuitry 16 duplicates the operand to form a complete sixty-four bit preconditioned word in the latch 21. In other words, an eight bit operand is duplicated eight times, a sixteen bit operand is duplicated four times and a thirty-two bit operand is duplicated twice.

Shifter 22 performs the rotation function by shifting the preconditioned word a number of times equal to the rotation count. The rotation count can be anywhere between zero and thirty-one. An operand can be rotated either to the right or to the left. FIGS. 5a–5e illustrate a number of examples rotating preconditioned words based on an eight bit operand by various number of bits in both directions. Similarly, FIGS. 6a–6c illustrate a couple of examples of rotating preconditioned words based on a sixteen bit operand by various number of bits in both directions. FIGS. 7a–7c show a couple of examples of rotating preconditioned words based on a thirty-two bit operand by various number of bits in both directions.

The above referenced figures show that as a preconditioned word is shifted to the right by one bit, a "don't care" bit (an "X" bit) is shifted into the most significant bit position of the shifter 22. An "X" bit is shifted in from the right on each right shift of the preconditioned word. Conversely, an "X" bit is shifted into the least significant bit position of shifter 22 for each left shift of the preconditioned word.

Multiplexer 24 selects that portion of the shifted preconditioned word corresponding to the resulting operand. Specifically, if the direction of rotation is to the right, the desired result would be taken from the lower thirty-two portion of shifter 22. Conversely, if the direction of rotation is to the left, the desired result would be taken from the upper thirty-two portion of shifter 22. The upper and lower thirty-two bit outputs of shifter 22 are connected to a multiplexer 24. Therefore, the output of multiplexer 24 corresponds to the direction of rotation of the selected rotation function performed on the operand. The output of multiplexer 24 is coupled back to general purpose register 12 by a thirty-two bit bus 11b. General purpose register 12 allows the result of the rotation function to be loaded into general purpose register from bus 11b. When a rotation of an eight bit operand is performed, general purpose register 12 only writes the 8-bit result back into its memory, so that other portions of the thirty-two bit word are not affected by the preconditioning. Similarly, for a sixteen bit operand, only sixteen bits are written back into the general purpose register 12.

While the preconditioning is shown in FIG. 3 as being performed on the entire 64-bit word, in some implementations, it may be more efficient to repeat eight bit and sixteen bit operands only in those locations of shifter 22 necessary based on the operand size and the direction of rotation. Since the maximum rotation count is 31, it is only necessary to precondition a valid bit string of thirty-two bits beyond the operand bits. Hence, depending on the rotation direction and the operand size, some bytes need not be duplicated during preconditioning. This concept is illustrated in FIGS. 8a–8d. FIGS. 8a and 8b shows how, for a rotate right instruction, an eight bit operand need only be duplicated in byte0–byte4 of latch 21 and a sixteen bit operand need only be duplicated in byte0 through byte 5 of latch 21. Similarly, FIGS. 8c and 8d shows how, for a rotate left instruction, an eight bit operand need only be duplicated in byte3 through byte7 of latch 21 and a sixteen bit operand need only be duplicated in byte2 through byte7 of latch 21. Consequently, alternative preconditioning circuitry could be implemented more efficiently in creating these shorter preconditioned words.

Rotate through carry left/right operations (RCL/RCR) require the Cy bit of the carry flag 28 to be rotated into and through the operand. The execution of an RCL instruction requires that when each bit is rotated, the Cy bit is shifted into the least significant bit of the operand and the most significant bit of the operand is shifted into the carry flag. Correspondingly, each bit rotation of an RCR instruction must shift the Cy bit into the most significant bit of the operand and shift the least significant bit of the operand into the carry flag.

Figure 9:
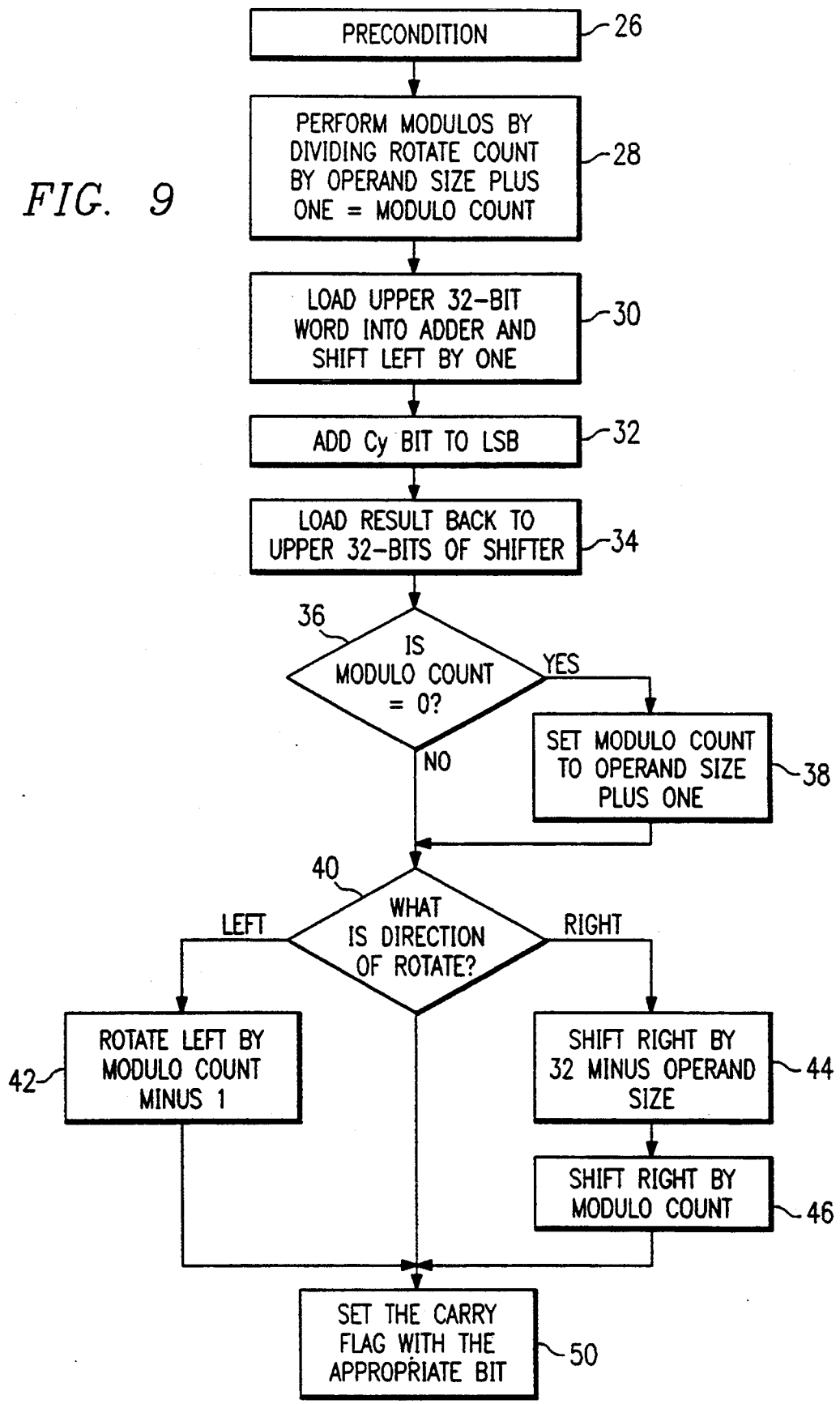
FIG. 9 is a flow chart illustrating the steps performed by the present invention in executing rotate through carry instructions.

A flow chart of the steps in executing rotate through carry instructions is shown in FIG. 9. An operand is input and processed through the precondition circuitry 16 in block 26 just as described above for a normal, "non-carry" rotate. The resulting preconditioned word is consequently loaded into shifter 22.

As a preliminary matter, if a rotation count is zero, then no shifting need be done and the rotation circuitry treats this as a "no-op".

Assuming the rotation count is not zero, a modulus function is performed on the rotation count in block 28. The modulus function reduces rotation counts greater than the operand size by multiples of the operand size plus one (i.e. either 9 for an eight bit operand or 17 for a sixteen bit operand). The result of the modulus function yields a modulo count. For example, an RCL by 24 for an eight bit operand places would result in a modulo count. of 6 (i.e. the remainder of 24 divided by 9).

Next, the Cy bit must be inserted from the carry flag into the preconditioned word to be rotated with the other bits. Inserting the Cy bit is accomplished with a two input adder 14. The upper thirty-two bit word of shifter 22 is input to adder 14 through a temporary register 13. Temporary register 13 is connected 8 in parallel to rotate/shift circuitry 10 with buses 11a and 11b. Carry flag 28 is also connected to adder 14. Adder 14 has a shift register on its input which is operable to shift the upper 32-bit word one bit to the left upon input in block 30. The Cy bit is then added to the least significant bit in block 32 and the result of is loaded back into the upper 32-bit portion of shifter 22 through temporary register 13 in block 34. This positions the Cy bit in the thirty-second position of the preconditioned word.

In decision block 36, it is determined whether the calculation performed in block 28 has resulted in a modulo count of zero. A modulo count of zero indicates that the carry flag would be rotated completely through a particular operand back into the carry flag position. In other words, for an eight bit operand, a rotate count of 9, 18, or 27 would put the operand bits back into their initial positions and the Cy bit would be back in the carry flag. For a sixteen bit operand, a rotate count of 17 would have the same effect. Consequently, if the modulo count is zero, the modulo count is set to the operand size plus one in block 38. By setting the modulo count to one plus the operand size, the modulo count is preset such that when the preconditioned word is shifted either to the left or right as described below, the desired result will equate to the original operand.

Figure 10A:
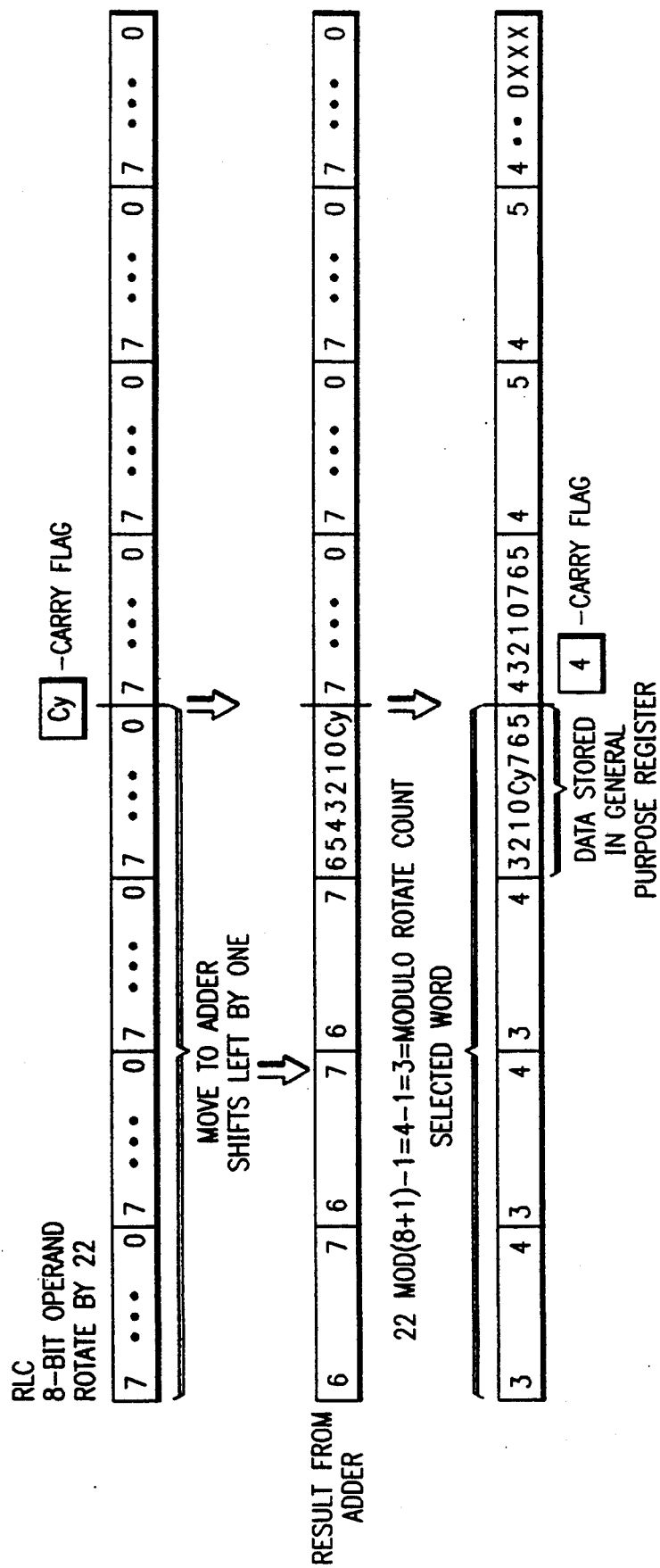
FIGS. 10a-10f illustrate examples of executing rotate through carry instruction on preconditioned words when the modulo count is not zero.
Figure 10B:
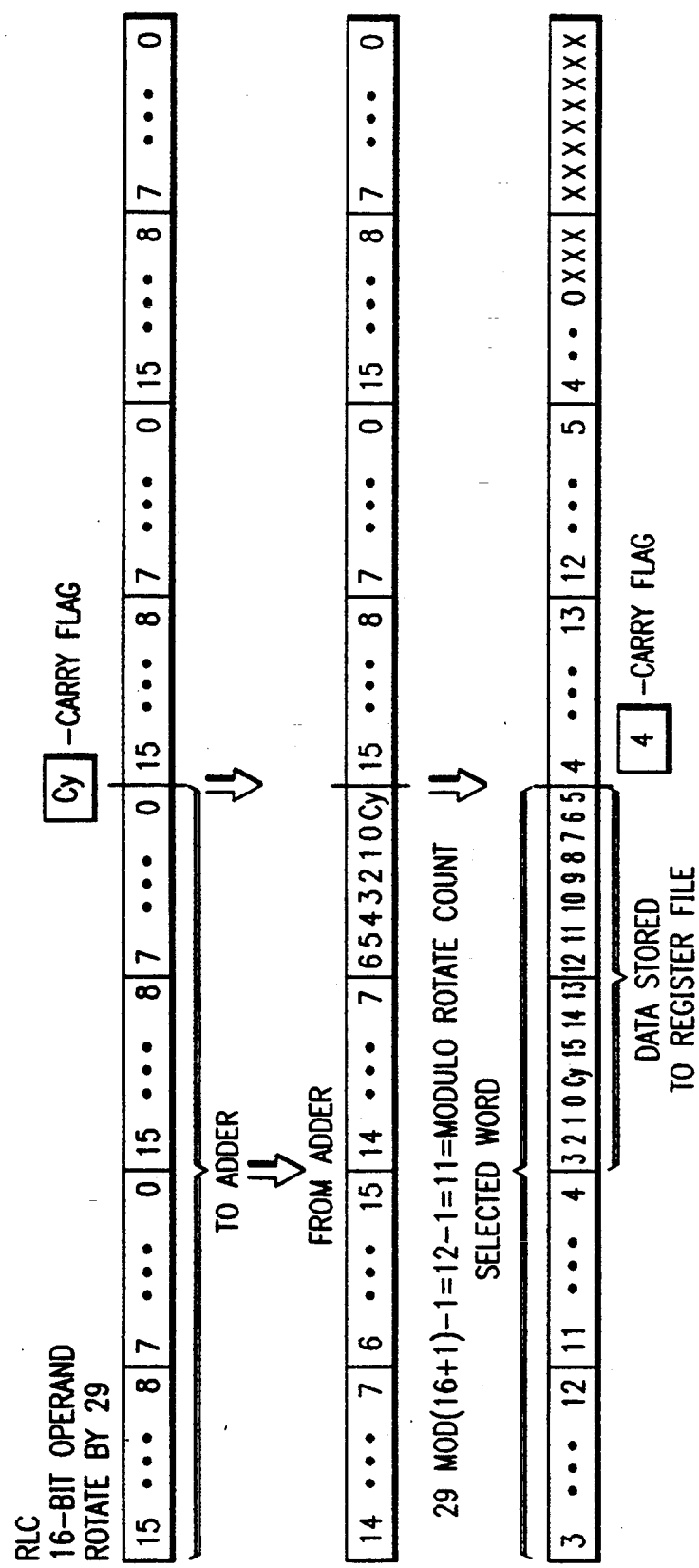
Figure 10C:
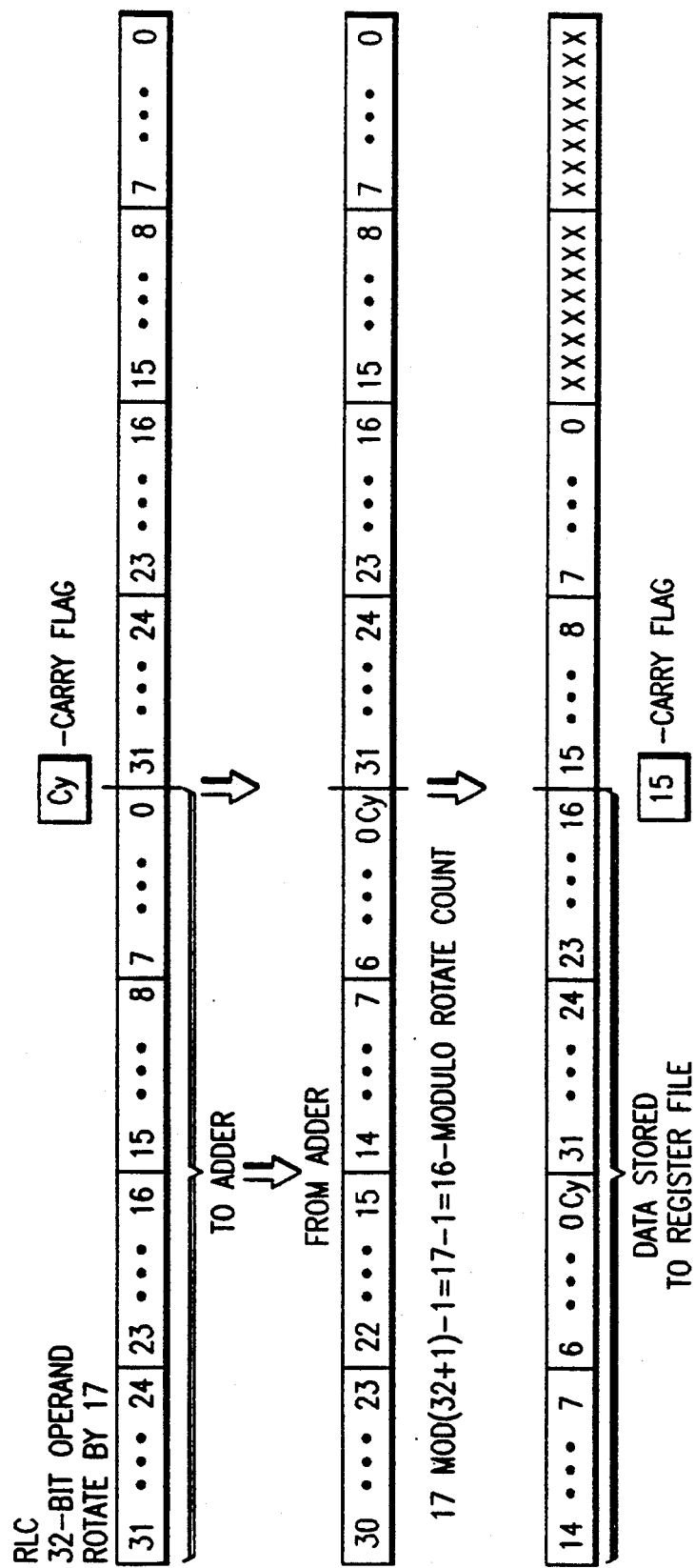

At this point, the actual shifting of the preconditioned word containing the Cy bit occurs. In decision block 40, the direction of shift depends on the desired direction of rotation. FIGS. 10a–10c illustrate examples of an RCL (left) instruction performed on a preconditioned word for each of the different size operands. For an RCL, the preconditioned word containing the Cy bit is shifted to the left a number of times equal to the modulo count minus one in block 40. The number of shifts is reduced by one since a one bit left shift was performed by adder 14 as described above in connection with blocks 30–34.

Figure 10D:
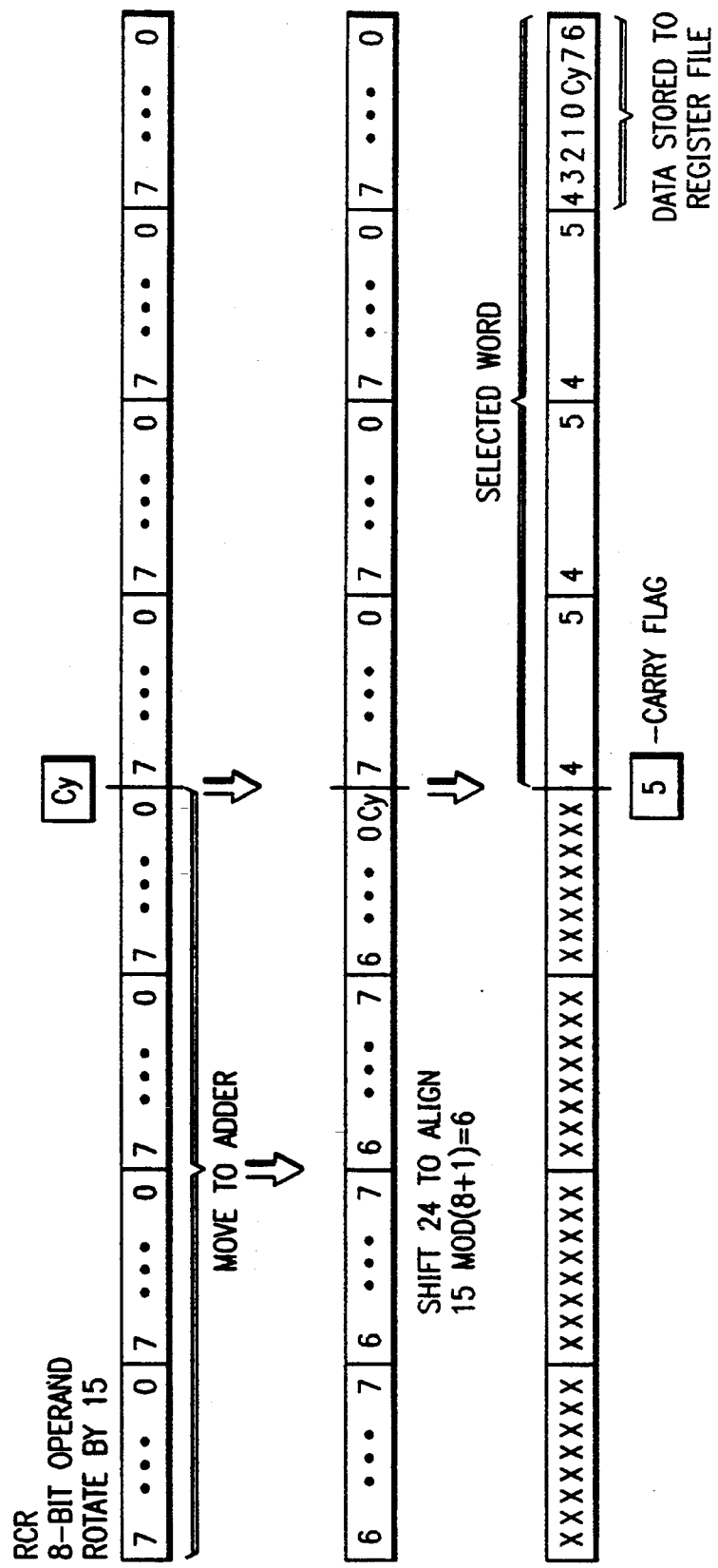
Figure 10E:
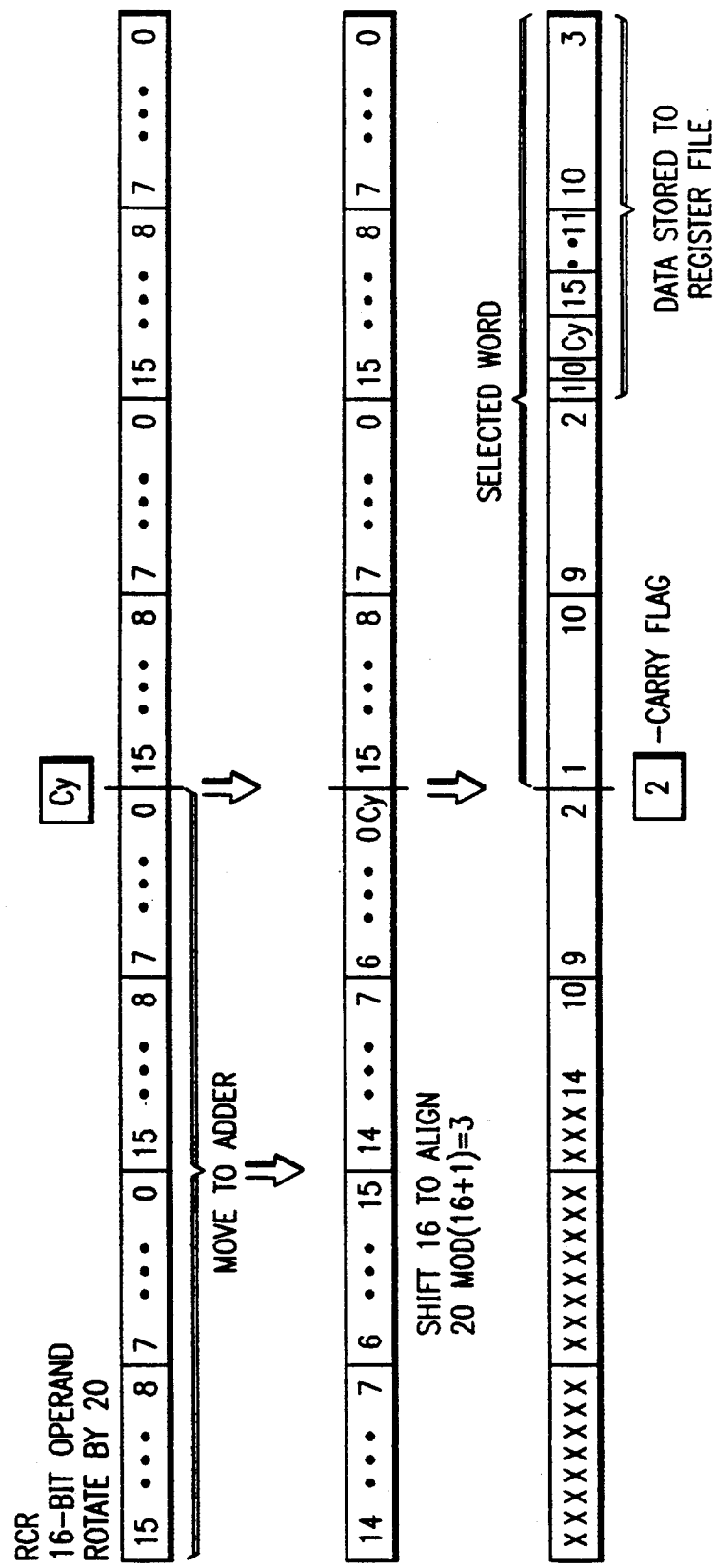
Figure 10F:
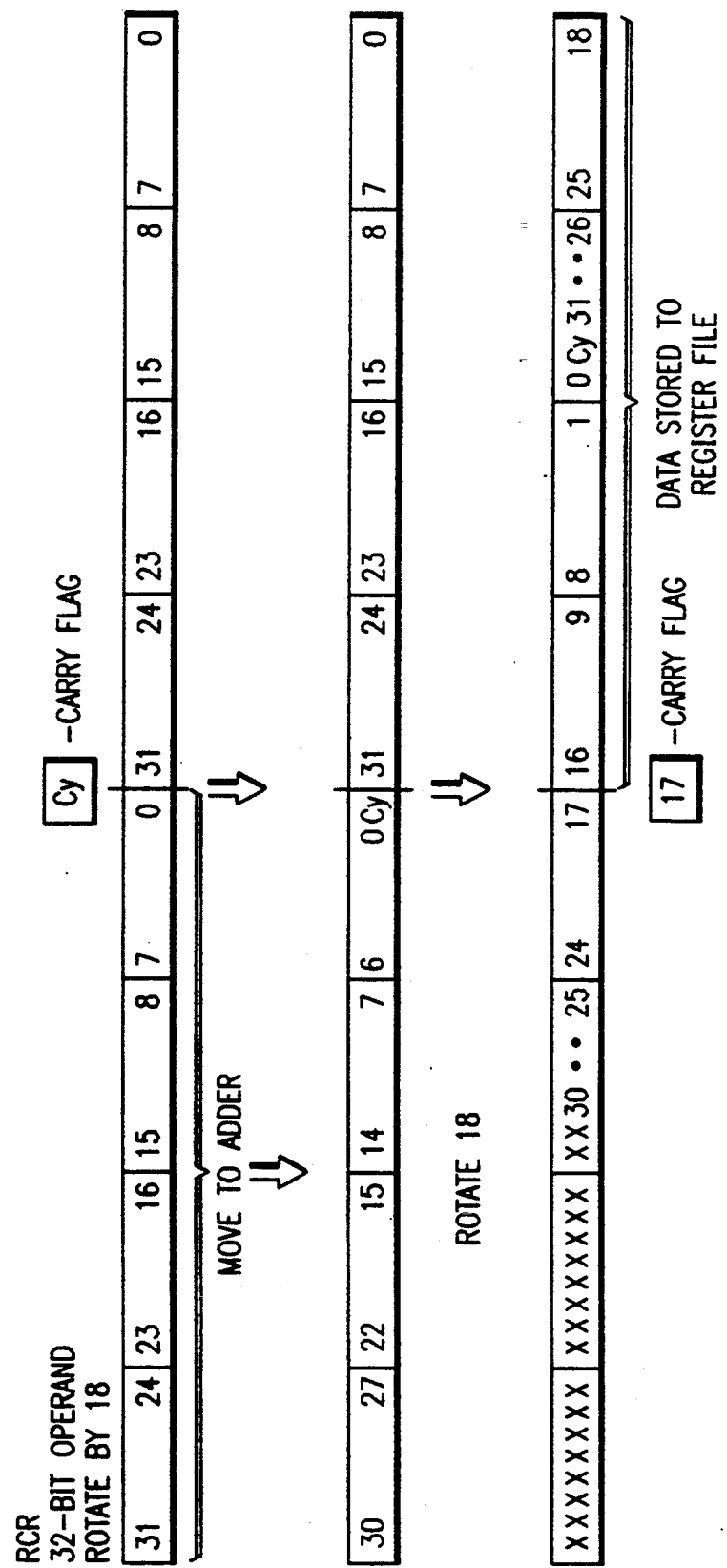

FIGS. 10d–10f illustrate examples of RCR (right) instructions performed on a preconditioned word for each of the different size operands. In a RCR operation, since the Cy bit is positioned in the thirty-second bit position of the preconditioned word, it must be shifted down to the appropriate position corresponding to the operand size. As shown in FIG. 10d, for an eight bit operand, the preconditioned word must be shifted to the right twenty-four places before shifting right by the modulo count. The initial twenty-four bit shift positions Cy one bit to the left of the lower 8-bits of the lower 32-bit word. As shown in FIG. 10e, for a sixteen bit operand, the preconditioned word must be shifted to the right by sixteen bits before shifting right by the modulo count. The initial shift positions Cy one bit to the left of the lower sixteen bits of the lower 32-bit word. As shown in FIG. 10f, for a thirty-two bit operand, the preconditioned word is merely shifted to the right a number of times equal to the rotation count. These operations are shown in blocks 44-46.

The carry flag is set with the appropriate value corresponding to the bit which would have been rotated out of the operand and into the carry flag on the last shift in block 50. The setting of the carry flag may be performed in software.

As can be seen, the present invention allows a rotate operation to be implemented as a straight shift of preconditioned data, without complex circuitry necessary to feedback data from one portion of the shifter to another. The preconditioning can be performed with minimal hardware and control circuitry, thereby reducing complexity and increasing speed of operation.

Although the Detailed Description of the invention has been directed to certain exemplary embodiments, various modifications of these embodiments, as well as alternative embodiments, will be suggested to those skilled in the art. For example, specific register structures, bit assignments, bus widths, and other implementation details are set forth solely for purposes of providing a detailed description of the invention. However, the invention has general applicability to performing rotate operations base on operand size.

Although the present invention has been described in detail, it should be understood that various changes, substitutions and alterations can be made herein without departing from the spirit and scope of the invention as defined by the appended claims.

What is claimed is:

1. In a data processing system that processes words of n bytes where operand size is from one to n bytes, rotation circuitry for rotating the bits of an operand by a number of bits corresponding to a rotation count, said rotating circuitry comprising:
   preconditioning circuitry that receives an input operand and generates a preconditioned word responsive to the size of the operand to be rotated;
   the preconditioning circuitry including duplication circuitry that duplicates the operand a predetermined number of times responsive to operand size; and
   shifting circuitry, coupled to the preconditioning circuitry, that, in response to the rotation count, shifts the preconditioned word by a selected number of bits.

2. The rotating circuitry of claim 1 and further comprising a multiplexer for selecting a predetermined portion of the shifted word responsive to a selected direction of rotation.

3. The rotating circuitry of claim 1 and further comprising circuitry for inserting a carry bit into said preconditioned word.

4. The rotating circuitry of claim 3 wherein said inserting circuitry comprises an adder operable to shift at least one of the inputs of the adder.

5. The rotating circuitry of claim 1 and further comprising a register file for storing all or part of the preconditioned word after shifting.

6. The rotating circuitry of claim 1 wherein said shifting circuitry comprises a shift register having an upper 32-bit portion to receive four bytes and a lower 32-bit portion to receive four bytes.

7. The rotating circuitry of claim 1 wherein said preconditioning circuitry comprises multiplexing circuitry for receiving the bits of an operand and duplicating the bits in predetermined portions of a register.

8. The rotating circuitry of claim 1 wherein this shifting circuitry receives from the preconditioning circuitry a 2 n byte preconditioned word.

9. In a data processing system that processes words of n bytes where operand size is from one to n bytes, a method of rotating the bits of an operand by a number of bits corresponding to a rotation count, comprising the steps of:
   receiving the operand;
   generating a preconditioned word based on duplicating said operand a predetermined number of times responsive to the size of the operand to be rotated; and
   responsive to the rotation count, shifting the preconditioned word by a selected number of bits to obtain a rotated operand.

10. The method of claim 9 and further comprising the step of selecting a predetermined portion of the shifted word responsive to a selected direction of rotation.

11. The method of claim 9 and further comprising the step of inserting a carry bit into the preconditioned word prior to shifting the preconditioned word.

12. In a data processing system that processes words of n bytes where operand side is one to n bytes, a method of rotating the bits of an operand along with a carry flag by a selected number of bits in a selected direction in accordance with a modified rotation count, comprising the steps of:
   receiving the operand;
   generating a preconditioned word based on duplicating the operand a predetermined number of times responsive to the size of the operand to be rotated;
   inserting the carry flag into the preconditioned word; and
   responsive to the modified rotation count, rotating the preconditioned word by a corresponding selected number of bits, to obtain a shifted operand.

13. The method of claim 12 wherein said rotating step comprises the step of rotating the preconditioned word responsive to said selected number of bits and the selected direction of rotation.

14. The method of claim 12 wherein said rotating step comprises the step of rotating the preconditioned word responsive to said selected number of bits, the selected direction of rotation and the operand size.

15. The method of claim 12 wherein the modified rotation count is obtained by determining the remainder of the division of said selected number of bits by the operand size incremented by one.

16. The method of claim 12 wherein said step of inserting the carry flag into the preconditioned word comprises the step of shifting a predetermined portion of said preconditioned word and adding the carry flag to the shifted portion of the preconditioned word.

17. The method of claim 12 and further comprising the step of setting to carry flag to a predetermined bit in said shifted preconditioned word.

* * * * *